United States Patent [19]

Perego

[11] Patent Number: 5,397,074

[45] Date of Patent: * Mar. 14, 1995

[54] APPARATUS AND METHOD FOR THREADING TAPE WOUND ON A REEL THROUGH A CASSETTE LOADING MACHINE

[75] Inventor: Luciano Perego, Mezzago, Italy

[73] Assignee: Tapematic U.S.A., Inc., Orlando, Fla.

[*] Notice: The portion of the term of this patent subsequent to Jun. 30, 2009 has been disclaimed.

[21] Appl. No.: 144,583

[22] Filed: Oct. 28, 1993

Related U.S. Application Data

[60] Continuation of Ser. No. 866,659, Apr. 8, 1992, abandoned, which is a division of Ser. No. 585,809, Sep. 20, 1990, Pat. No. 5,165,616.

Foreign Application Priority Data

Aug. 6, 1990 [IT] Italy ........................... 21227A

[51] Int. Cl.$^6$ ........................... B65H 20/16
[52] U.S. Cl. ........................... 242/562.1
[58] Field of Search ........................... 242/56 R, 55, 58.4, 242/192, 195, 562, 562.1; 226/91, 92

[56] References Cited

U.S. PATENT DOCUMENTS

| | | | |
|---|---|---|---|
| 3,004,729 | 10/1961 | Barkhuff | 242/55.13 |
| 3,643,889 | 2/1972 | Krause | 242/182 |
| 3,920,195 | 11/1975 | Sills et al. | 242/180 |
| 3,921,822 | 11/1975 | Dixon | 214/1 |
| 4,114,252 | 9/1978 | Kon et al. | 242/56 R |
| 4,216,052 | 8/1980 | Zielke | 242/56 R |
| 4,332,355 | 6/1982 | Zopfy et al. | 242/56 R |
| 4,629,138 | 12/1986 | Kubo | 242/56 R |
| 4,836,464 | 6/1989 | Perego | 242/56 R |
| 4,840,320 | 6/1989 | Shigeta et al. | 242/58 |
| 5,121,886 | 6/1992 | Perego | 242/57 |
| 5,125,587 | 6/1992 | Perego | 242/56 R |
| 5,165,616 | 11/1992 | Perego | 242/55 |

Primary Examiner—Daniel P. Stodola
Assistant Examiner—John P. Darling
Attorney, Agent, or Firm—Edgar H. Haug; Adam L. Brookman

[57] ABSTRACT

An apparatus and method for engaging tape wound on a reel and for threading the tape on various members of a tape loading machine comprises a grasping member supported by a driving bar slidably engaged in a support arm and movable in a vertical direction. The support arm extends downwardly from a main carriage horizontally movable along guide bars slidably carried on top of a tape loading center. The grasping member is designed to pick up a closure tab associated with a pancake previously mounted on a support hub belonging to the loading machine. By the combination of vertical and horizontal movements imparted to the grasping member by the driving bar and the main carriage, the magnetic tape connected to the closure tab is partly unwound from the pancake and guided in a predetermined path between the different members of the loading machine.

23 Claims, 4 Drawing Sheets

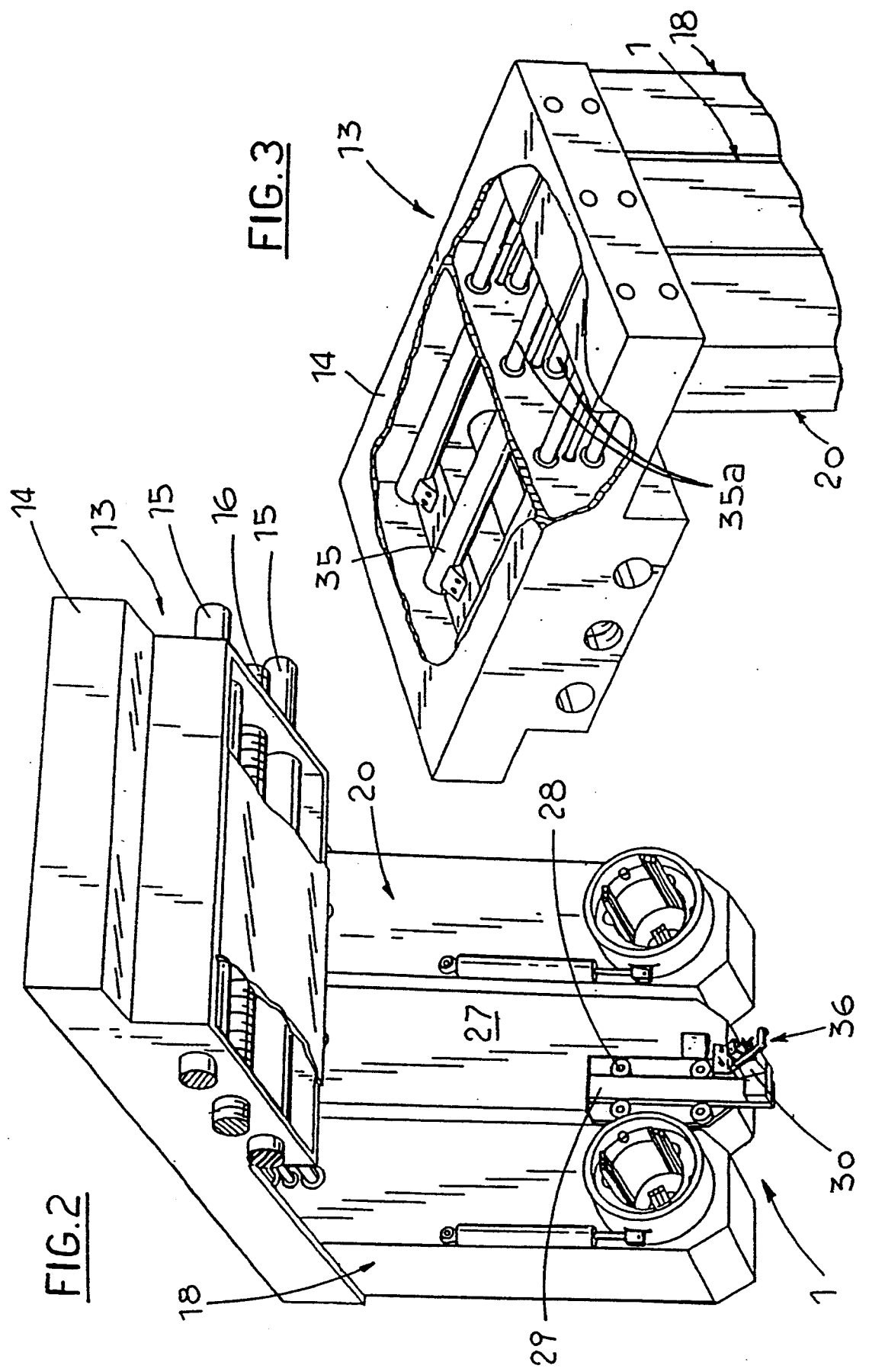

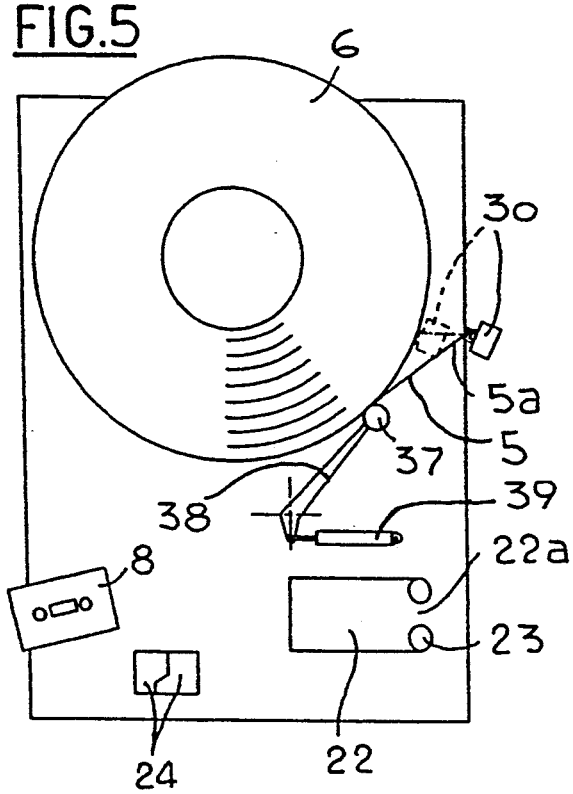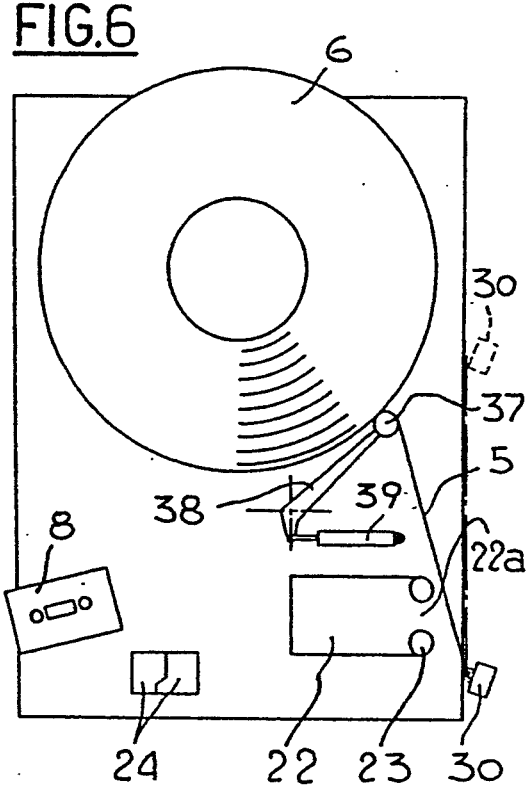

APPARATUS AND METHOD FOR THREADING TAPE WOUND ON A REEL THROUGH A CASSETTE LOADING MACHINE

This application continuation of application Ser. No. 07/866,659, filed Apr. 8, 1992, now abandoned, which is a division of application Ser. No. 07/585,809, filed Sep. 20, 1990, now U.S. Pat. No. 5,165,616.

BACKGROUND INVENTION

The present invention relates generally to a method and apparatus for picking up and threading magnetic tape from a supply reel through a tape loading machine.
Prior Art In typical prior art tape loading machines, the cassettes to be loaded move, one at a time, from a supply magazine to a loading station where the winding of a predetermined amount of magnetic tape onto the hubs located inside the cassette is automatically carried out. The tape is fed from a supply reel (commonly referred to as "pancake") which is rotatably mounted on a support hub.

Tape loading machines have reached a high degree of automation such that hand operations have been greatly reduced. The hand operations which remain are substantially restricted to the periodic arrangement of the cassettes to be loaded into the machine's supply magazine as well as the periodic replacement of empty pancakes.

The replacement of the pancake on the loading machine is, frequently, not limited to the removal of the out of tape pancake from the support hub and its replacement by a full pancake. Other operations may also be necessary in order to carry out the threading of the tape through the tape loading machine.

In greater detail, the operator must first pick up one end of the tape, commonly fastened to the pancake by an adhesive closure tab provided with a free portion projecting outwardly from the pancake itself. Then the tape must be partially unwound from the pancake and passed through a control unit designed to synchronize the motor associated with the pancake support hub and the motor causing the winding of the tape onto the cassette hub. Then the tape must pass over a counter wheel designed to measure the amount of tape wound into the cassette, as well as one or more guide rollers close to which are disposed several mechanisms for carrying out the different extraction, positioning, cutting and splicing operations necessary to complete the loading of the tape into the cassette.

Since it is often necessary to hand thread the tape through the tape loading machine, the possibility of entrusting a single operator with the management of many loading machines is reduced.

SUMMARY OF THE INVENTION

The main object of the present invention is to eliminate the above drawbacks, by providing a method and apparatus adapted to automatically pick up one end of the tape from a pancake mounted on a support hub and guide it in a predetermined path to thread the tape between the different members of the loading machine.

Another object of the present invention is to make the method and apparatus adaptable for use with loading machines able to automatically carry out the replacement of the pancakes on the support hub, so as to fully eliminate the necessity for manual intervention when a pancake runs out of tape. A machine as above specified, to which particular reference will be made in the course of the present description, has been the object of parallel patent applications filed in the name of the same Applicant which are incorporated herein by reference.

The foregoing and further objects will become more apparent in the course of the following description.

The apparatus of the present invention preferably comprises a main carriage movable in a direction at right angles to the axis of the pancake, a support arm extending from the main carriage in a direction substantially at right angles to the movement direction of the carriage, a grasping member operatively carried by the support arm, provided with two gripping fingers which can be moved close to each other in order to pick up the free end of a closure tab, and movable at right angles to the movement direction of the main carriage in order to partially unwind the tape from the pancake and guide it in a predetermined path between the members of the loading machine.

BRIEF DESCRIPTION OF THE DRAWINGS

In the drawings:

FIG. 2 is a partial cutaway, perspective fragmentary view showing the apparatus of the present invention associated with a manipulating unit of the tape loading center shown in FIG. 1;

FIG. 3 is a partial cutaway, perspective fragmentary view of the manipulating unit shown in FIG. 2 as viewed from the opposite side;

FIGS. 5 through 8 diagrammatically show different positions of a grasping member of the present invention while tape is being threaded through a cassette loading module of the tape loading center of FIG. 1.

DESCRIPTION OF A PREFERRED EMBODIMENT

Figure 1:
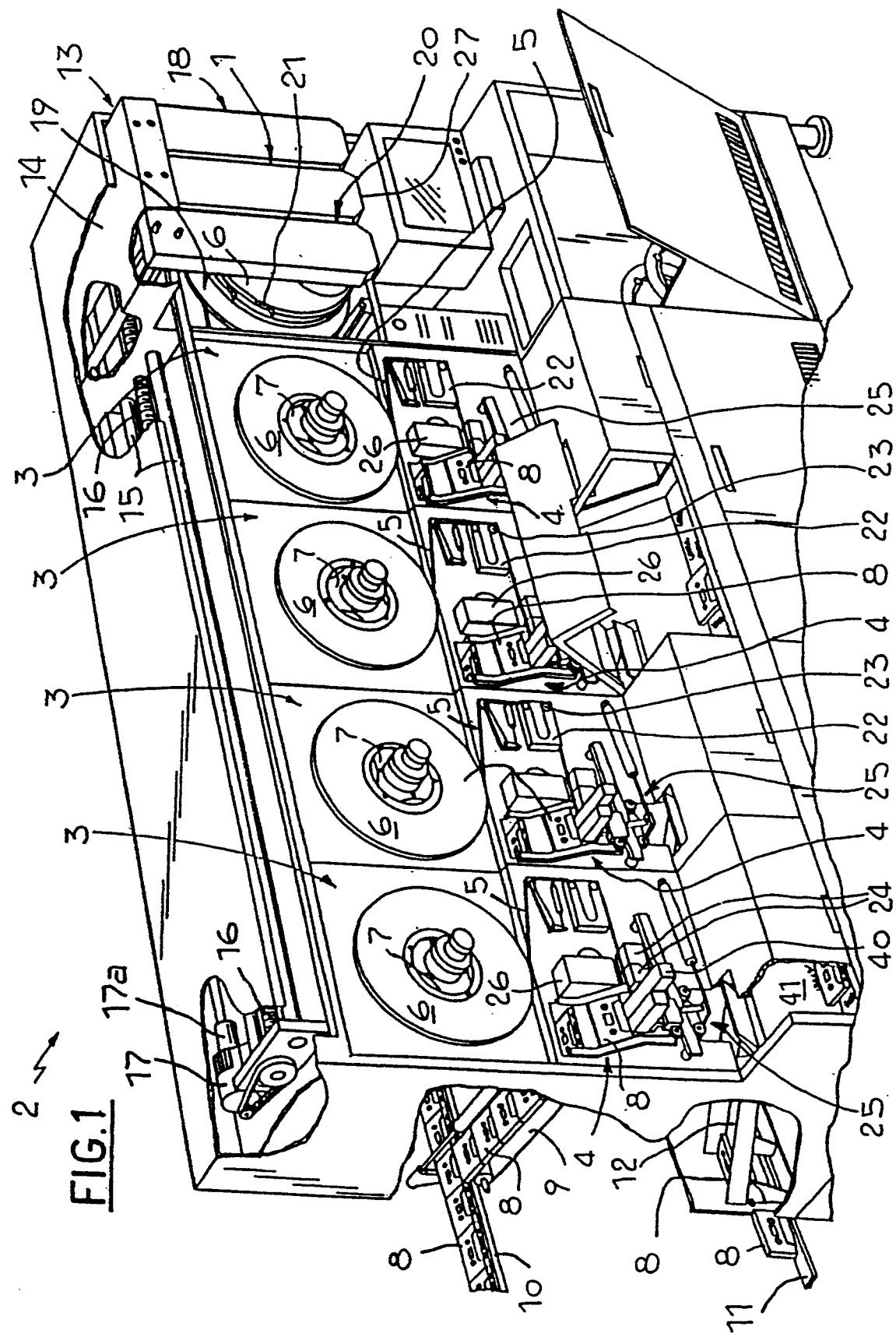
FIG. 1 is a partial cutaway, perspective fragmentary view showing a tape loading center including the apparatus of the present invention.
Figure 4:
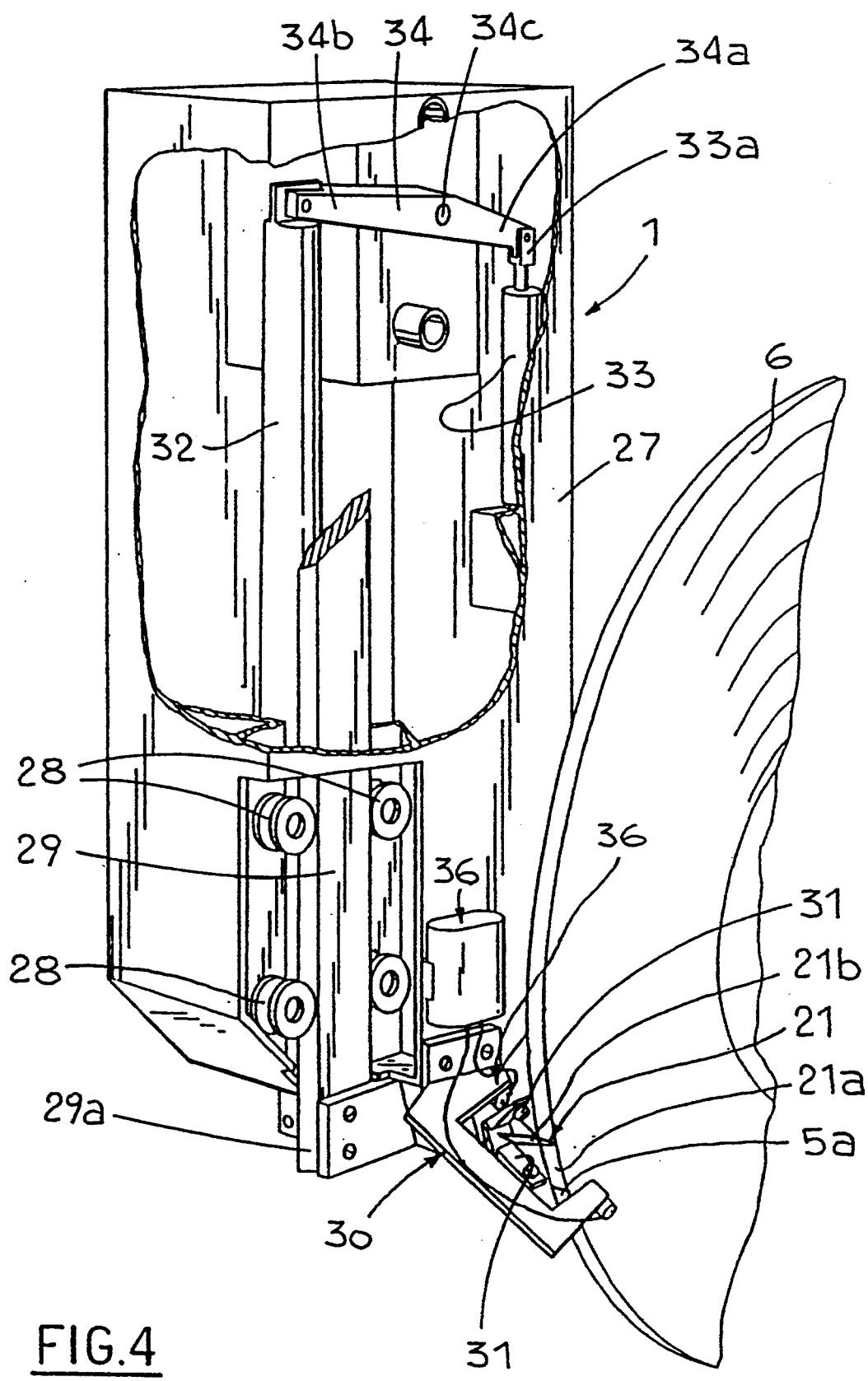
FIG. 4 is a partial cutaway, perspective view of the apparatus of the present invention while in operation on a pancake.

Referring to the FIGS. 1, 2 and 4, an apparatus for picking up and guiding in a predetermined path a magnetic tape wound onto a pancake in an automatic cassette loading machine in accordance with the present invention is generally identified by reference numeral 1.

In the example shown, the apparatus 1 is associated with a tape loading center, generally identified by 2 in FIG. 1. (Only the essential parts of the type loading center will be described, as it discussed in detail in co-pending patent applications filed on the same date in the name of the same Applicant and previously incorporated herein by reference).

The tape loading center 2 has a plurality of loading modules 3 disposed consecutively in side-by-side relation, each of them being provided with a loading station 4 at which a predetermined amount of magnetic tape 5 coming from a pancake 6 mounted on a rotatable support hub 7, is wound into a cassette 8. The loading stations 4, of the different modules 3, are individually fed with cassettes 8 by in-feed conveyors 9 terminating at a supply conveyor 10. When the loading has been carried out each cassette 8 is released from the loading station 4 and drops down to an output conveyor 11 through a discharge chute 12. The tape loading center 2 is also provided with a manipulating unit 13 which starts operating each time the pancake 6 of one of the loading modules 3 runs out of use tape 5. To this end, the manipulating unit 13 is provided with a main carriage 14 mounted on guide bars 15 extending horizontally on top of the loading center 2. The main carriage 14 is movable at right angles to the axes of the pancakes 6 mounted on hubs 7. The carriage 14 is moved by a threaded rod 16 which is rotated by a motor 17. An encoder 17a, or technically equivalent means, controls the motor 17 and sends signals concerning the positioning and displacements of the main carriage 14 to an electronic control box (not shown). The control box carries out the operating management of the entire tape loading center 2.

The main carriage 14 operatively carries a supply device 18 designed to pick up a full pancake 6 from a supply magazine 19 holding a number of pancakes. Also associated with the main carriage 14 is a discharge device 20, disposed in side-by-side relation to the supply device 18.

When a sensor detects that a pancake 6, associated with any of the loading modules 3, is out of tape, the discharge device 20 is brought, by moving the main carriage 14, to a position facing the support hub 7 belonging to that module 3 so that it removes the empty pancake 6 therefrom. Subsequently, by a further moving forward of the main carriage 14, the supply device 18 is brought in front of the particular support hub 7 in order to fit thereon the new pancake 6 loaded with use tape 5 which has been previously picked up from the pancake supply magazine 19.

Structure and operation of the supply and discharge devices 18 and 20, as well as of the support hub 7 and the supply magazine 19 are not further described herein as they have discussed in detail in parallel patent applications filed on the same date in the name of the same Applicant which include U.S. application Ser. No. 07/585,710, filed Sep. 20, 1990, entitled now U.S. Pat. No. 5,203,801. Apparatus for Supplying Tape Loading Machines with Reel of Tape, which is incorporated herein by reference.

The tape wound on the new pancake 6, mounted on the particular support hub 7, will have its end 5a fastened to the pancake itself by means of a closure tab 21. As shown in FIG. 4, the closure tab 21 has an adhesive portion 21a fastening the end 5a onto the pancake 6 and a free portion 21b projecting outwardly from the pancake 6 itself. The closure tab 21 is adapted to be grasped at its free portion 21b in order to be disengaged from the pancake 6 so that the tape 5 can be partly unwound therefrom and guided in a predetermined path between several members of the cassette loading machine 2 through which the tape 5 must pass before reaching the loading station 4.

In greater detail, the tape 5 is first passed through a control unit 22 which is adapted to insure that motors (not shown) associated with the driving hub 7 and the loading station 4 are synchronized.

In addition, the tape 5 must pass over a counter wheel 23 which detects the amount of tape 5 wound into each cassette 8. Finally, the tape 5 must reach and rest on one or more guide rollers 28 facing the loading station 4. Operating close to these rollers 28 is a cutter mechanism (not shown) which cuts the tape when winding into each cassette 8 is completed and which cuts the leader tape after the extraction group extracts the leader from the cassette 8, and positions it on the guide blocks 24.

All operations necessary for the engagement of the tape 5 between the different members mentioned above are carried out by the apparatus 1 of the present invention.

As clearly shown in FIGS. 2, 3 and 4, apparatus 1 comprises a support arm 27 extending downwardly from the main carriage 14, at a direction substantially at right angles to the direction of movement of the carriage 14. Slidably guided in the support arm 27 in a vertical direction through a plurality of rollers 28, is a driving bar 29 having a grasping member 30 connected to its lower end. The grasping member 30 (not described in detail as it is the object of parallel patent applications filed in the name of the same Applicant including U.S. Pat. Ser. No. 07/585,595, filed Sep. 20, 1990, now U.S. Pat. No. 5,121,886 entitled Process and Apparatus for Finding One End of Tape Wound Onto a Reel, incorporated herein by reference) has a pair of gripping fingers 31 which can be moved close to each other for picking up the closure tab 21.

The grasping member 30 is movable in a direction at right angles to the movements of the main carriage 14, upon command of at least fluid-operated actuator 32 which operates between the support arm 27 and the driving bar 29. Preferably an additional fluid-operated actuator 33 is also provided, acting between the support arm 27 and the main actuator 32. This additional actuator 33 imparts a reciprocating motion to the grasping member 30 in a predetermined path when the driving bar 29 is kept to its maximum extension upon the action of the main actuator 32. As clearly shown in FIG. 4, the additional actuator 33 is linked to the arm 27 and acts, through its rod 33a, upon one end 34a of a rocker lever 34 which has its fulcrum at 34c an opposite end 34b which is linked to the main actuator 32.

Preferably the support arm 27 is also connected to the main carriage 14 by guide members 84 on which the arm 27 is moved, upon command of another fluid-operated actuator 35, in a direction parallel to the axis of the pancakes 6. As a result of the movements of the support arm 27 the grasping member 30 can be moved close to and away from the pancakes 6. This is from a rest position in which the member 30 is axially spaced apart from the pancakes 6 so that it does not interfere with the pancakes 6 and support hubs 7 when the main carriage 14 is being moved, to a working position in which it substantially operates in the same plane as the pancake, as viewed in FIG. 4.

In a preferred embodiment of the present invention, an idler roller 37 is also provided. It is rotatably engaged with one end of a lever 38 having its fulcrum on each loading module 3 and movable about its pivot point, upon command of a fluid-operated cylinder 39. As the lever 38 pivots, it shifts the idler roller 37 from a first working position, in which it acts against the lower peripheral edge of the pancake (FIGS. 5, 6 and 7) to keep the tape against said pancake, to a second working position in which it is moved away downwardly from the pancake itself (FIGS. 1 and 8) to guide the tape 5 while the cassettes 8 are being loaded.

Turning to the operation of the present invention, before the grasping member 30 starts operating, other means, through the use of a reading member 36 provided with a photoelectric cell, must find the closure tab 21 on the circumference of the pancake 6. The positioning of the pancake itself is controlled so that, as shown in FIG. 4, the tab 21 can be located at a predetermined point enabling its the grasping member 30 to easily pick it up. (The reading means is not described herein as it has been discussed in detail in the previously incorporated patent application entitled Process and Apparatus for Finding One End of Tape Wound Onto a Reel.

When the closure tab 21 has been positioned at the predetermined point, the grasping member 30, held to its maximum raised position by the main and additional actuators, 32 and 33 respectively, is activated so that the gripping fingers 31 will be moved close to each other to pick up the free portion 21b of the closure tab 21.

At this point the main carriage 14 is slightly shifted on the guide bars 15 so as to cause the detachment of the closure tab 21 from the pancake 6. Then the grasping member 30, upon command of the main actuator 32 and optionally with the aid of the additional actuator 33, is moved downwardly until the driving bar 29 reaches its maximum extension. This enables the tape 5 to be pulled in front of an access opening 22a provided in the control unit 22, as shown in FIG. 6.

Next, the main carriage 14 is moved along the guide bars 15 so as to cause a horizontal displacement of the grasping member 30 underneath the control unit 22 towards the guide blocks 24. In this situation the tape 5 is partially wound over the counting wheel 23.

As the dotted line in FIG. 7 clearly shows, during the horizontal movement of the grasping member 30 the additional actuator 33 is operated in order to slightly raise the grasping member 30, thereby enabling it to ride over the guide blocks 24. When the grasping member 30 has moved past the blocks 24, the additional actuator 33 operates to lower the grasping member so that the tape 5 is laid onto the blocks 24.

At this point, the gripping fingers 31 are moved apart from each other and the closure tab 21 is released. Then the actuator 35 drives the support arm 27 away from the pancake 6 and the main and additional actuators 32 and 33 bring the grasping member 30 to its starting position. Simultaneously, the main carriage 14 moves backward along the guide bars 15 to bring the manipulating unit 13 again in front of the supply magazine 19.

As seen in FIG. 8, at the end of this operation the tape 5 will be laid on the blocks 24 an held thereon. Meanwhile the idler roller 37 which had been previously brought to its first working position now reaches its second working position thus enabling the control unit 22 to suck the tape 5 inside it, as shown in FIG. 8.

It is also possible to rotate the pancake 6 before the idler roller 37 is lowered to its second working position, in order to sufficiently unwind the tape 5 so that it can be sucked in by the control unit 22. The tape 5 will then be engaged, by an additional winding member 40 associated with the extraction group 25. This winding member 40 is designed to wind a predetermined amount of tape 5 which will be subsequently dropped down and away, after the tape has been cut in the region of blocks 24. This "scrap" tape is dropped down into a receptor vessel 41 associated with the particular loading module 3.

It will be recognized by one of skill in the art that the apparatus, due to its particular structure, is adaptable to different types of tape loading machines, since it will be possible to guide the tape according to any path by merely combining the vertical movements imparted to the driving bar 29 with the horizontal movements imparted to the main carriage 14.

In particular, while the apparatus in question has been described with reference to a cassette loading machine capable of automatically carrying out the replacement of the pancakes on the respective hubs, it can also be advantageously associated with less advanced loading machines in which the replacement of the pancakes occurs by hand and is made by an operator. In this case too, the use of the apparatus in question would involve a reduction of time in the operator's work so that a single operator will be able to manage a greater number of loading machines simultaneously.

Although the present invention has been described with reference to a specific embodiment, neither the exact described operation, nor the specific structure mentioned should be construed as limiting since the disclosed embodiment is merely illustrative of the invention. One of skill in the art may alter the described embodiment without departing from the spirit or scope of the invention.

What is claimed:

1. An apparatus for engaging tape wound on a reel and for threading the tape through various members of a tape loading machine comprising:
   a main carriage movable relative to the axis of the reel;
   a support arm extending from said main carriage and movable relative to said main carriage; and
   tape pick-up means operatively connected to said support arm and movable relative to said support arm, wherein said pick-up means comprises gripping means for engaging a free end of the tape wound onto said reel.

2. An apparatus according to claim 1, wherein said tape loading machine has a top, a bottom, a front and a back and wherein said main carriage is movable along the top of said tape loading machine.

3. An apparatus according to claim 2, wherein said main carriage is slidably mounted on guide bars mounted on top of said tape loading machine.

4. An apparatus according to claim 3, wherein said main carriage is driven along said guide bars by a threaded rod, rotated by a motor.

5. An apparatus according to claim 1, wherein said tape loading machine has a top, a bottom, a front and a back and wherein said support arm is movable toward and away from the front of said tape loading machine.

6. An apparatus according to claim 1, wherein said tape loading machine has a top, a bottom, a front and a back and wherein said pick-up means is movable along the front of said tape loading machine, toward and away from the bottom of said tape loading machine.

7. An apparatus according to claim 6, wherein said pick-up means further comprises a driving bar slidably guided in said support arm.

8. An apparatus according to claim 7, wherein said driving bar is vertically driven along the front of said tape loading machine by at least a first actuator.

9. An apparatus according to claim 8, wherein said driving bar is also vertically driven along the front of said tape loading machine by a second actuator.

10. An apparatus according to claim 9, wherein said second actuator acts on a first end of a rocker lever which rocker lever engages said first actuator on a second end.

11. An apparatus according to claim 1, further comprising reading means operatively connected to said pick-up means for locating the free end of the tape.

12. An apparatus for engaging tape wound on reel and for threading the tape through various members of a tape loading machine comprising:

a main carriage movable relative to the axis of the reel; and tape engagement means movable in at least four directions relative to said main carriage for picking up a free end of the tape wound on the reel and for bringing the tape into engagement with at least one guide block.

13. An apparatus according to claim 12, wherein said tape loading machine has a top, a bottom, a front and a back and wherein said main carriage is movable along the top of said tape loading machine.

14. An apparatus according to claim 13, wherein said tape loading machine has a top, a bottom, a front and a back and wherein said tape engagement means further comprises grasping means movable along the front of said tape loading machine, toward and away from the bottom of said tape loading machine.

15. An apparatus according to claim 14, further comprising reading means operatively connected to said grasping means for locating the free end of the tape.

16. An apparatus according to claim 13, wherein said main carriage is slidably mounted on guide bars mounted on top of said tape loading machine.

17. An apparatus according to claim 10, wherein said main carriage is driven along said guide bars by a threaded rod, rotated by a motor.

18. An apparatus according to claim 12, wherein said tape loading machine has a top, a bottom, a front and a back and wherein said tape engagement means comprises a support arm movable toward and away from the front of said tape loading machine.

19. An apparatus for engaging tape wound on reel and for threading the tape through various members of a tape loading machine having a top, a bottom, a front and a back comprising:

a main carriage movable relative to the axis of the reel along the top of said tape loading machine; and tape engagement means movable in at least four directions relative to said main carriage for picking up a free end of the tape wound on the reel and for bringing the tape into engagement with at least one guide block wherein said tape engagement means comprises grasping means movable along the front of said tape loading machine, toward and away from the bottom of said tape loading machine and a driving bar slidably guided in said support arm.

20. An apparatus according to claim 19, wherein said driving bar is vertically driven along the front of said tape loading machine by at least a first actuator.

21. An apparatus according to claim 20, wherein said driving bar is also vertically driven along the front of said tape loading machine by a second actuator.

22. An apparatus according to claim 21, wherein said second actuator acts on first end of a rocker lever which rocker lever engages said first actuator on a second end.

23. A method of engaging tape wound on a reel and threading the tape through various members of a tape loading machine comprising the steps of: moving a main carriage to a position proximate a free end of the tape wound on a reel;

locating the free end of tape with a reading member operatively connected to a tape pick-up means;

gripping the free end of tape with gripping means operatively connected to said pick-up means; and unwinding tape from the reel and moving it between various members of the tape loading machine by moving:

said main carriage, a support arm connected to said main carriage and said pick-up means carrying said gripping means and operatively connected to said support arm.

* * * * *